UNITED STATES PATENT OFFICE.

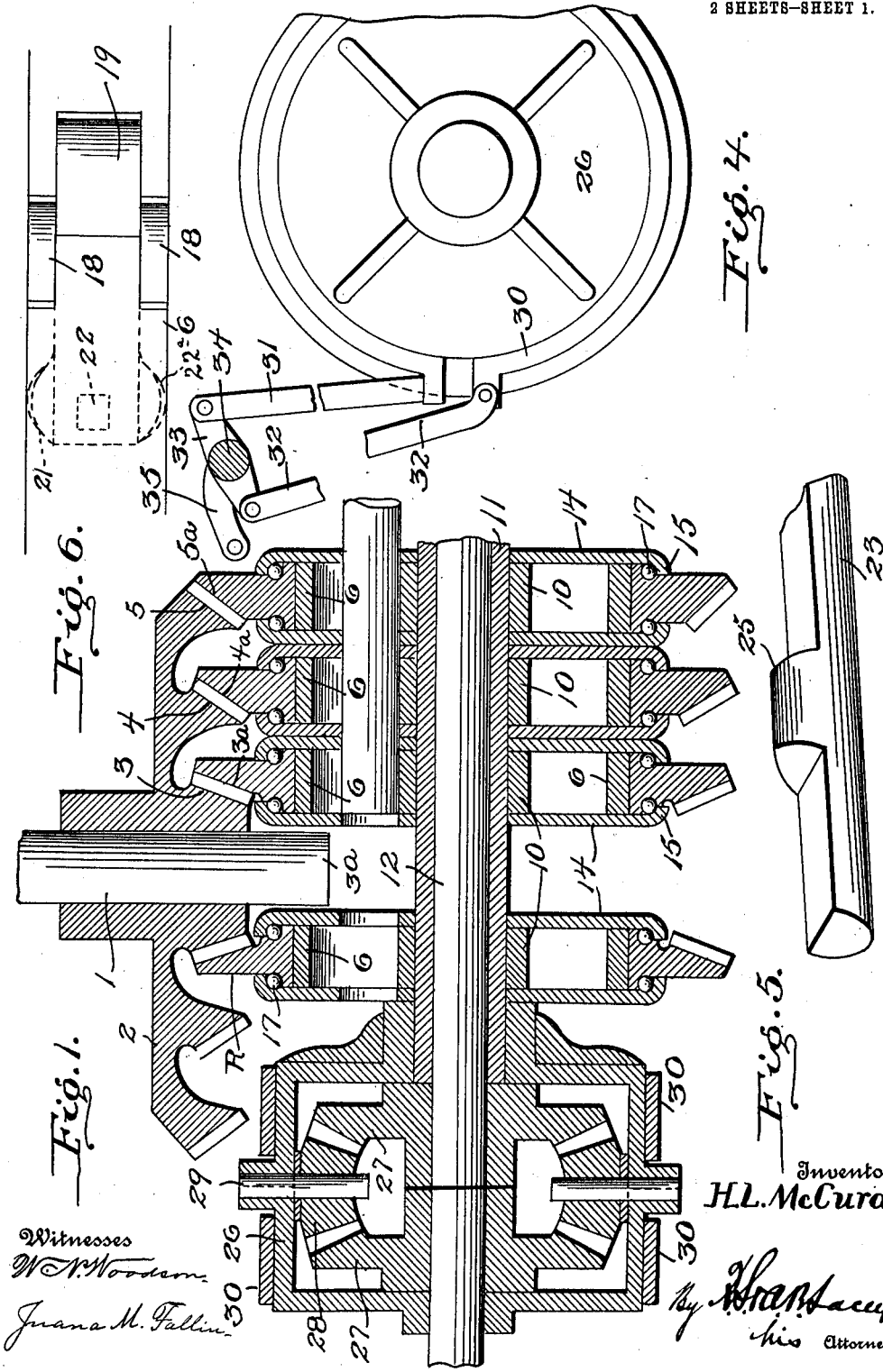

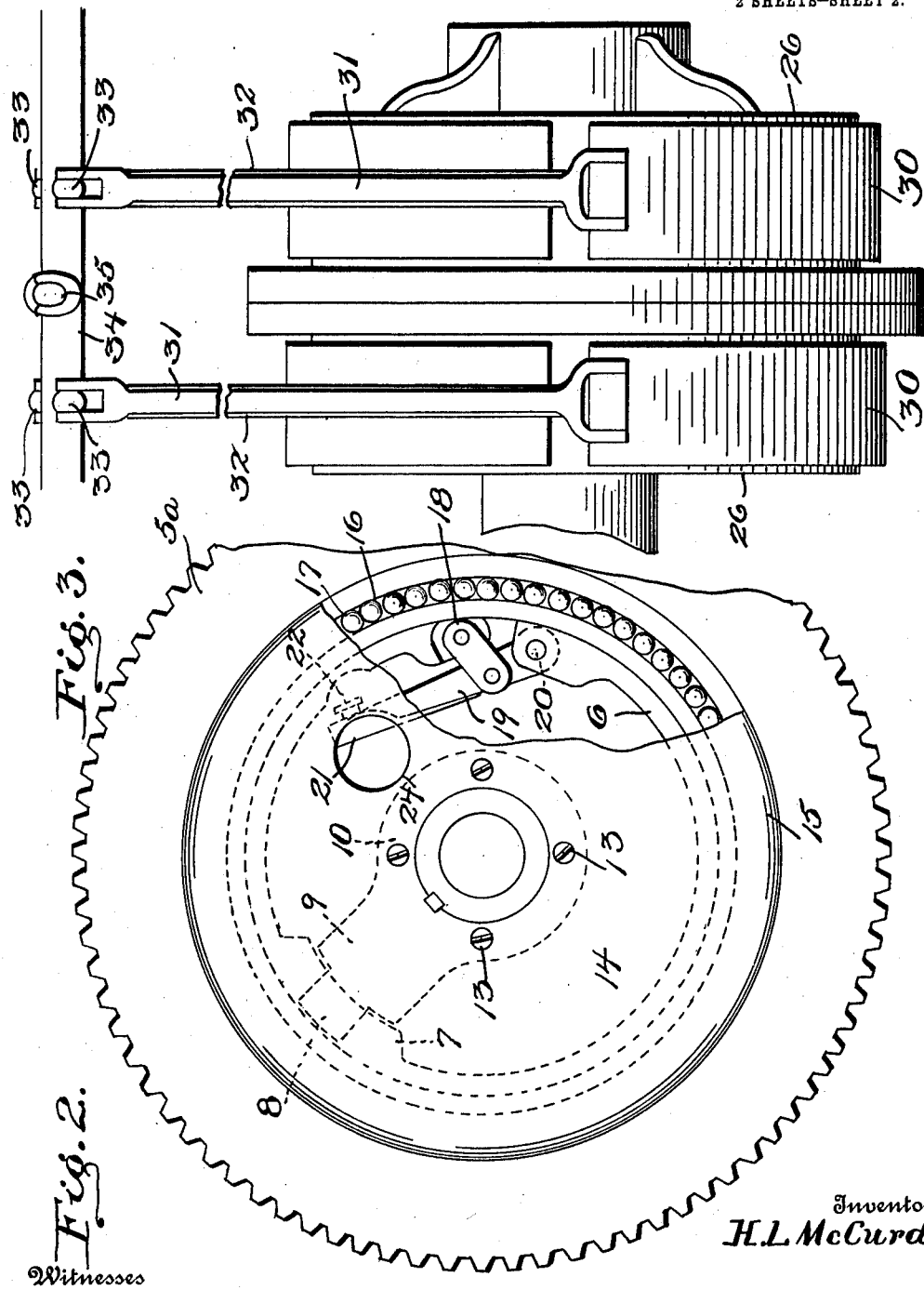

HORACE L. McCURDY, OF COLEMAN, TEXAS.

TRANSMISSION-GEARING.

1,031,193.  Specification of Letters Patent.  Patented July 2, 1912.

Application filed November 26, 1910. Serial No. 594,389.

*To all whom it may concern:*

Be it known that I, HORACE L. MCCURDY, citizen of the United States, residing at Coleman, in the county of Coleman and State of Texas, have invented certain new and useful Improvements in Transmission-Gearing, of which the following is a specification.

This invention comprehends certain new and useful improvements in power transmission gearing, and is designed particularly for automobiles or other self-propelled vehicles, although it is to be understood that the invention is not limited to this use as it is equally applicable for other uses generally, where a plurality of speeds is required.

The invention has for its primary object an improved mechanism of this character in which all danger of stripping the gear teeth is entirely eliminated, the gear teeth for the different speeds being constantly in mesh, and the mechanism being therefore a non-sliding gear transmission.

The invention also has for its object a mechanism of this character in which the parts are so constructed and arranged that all jarring in starting the automobile for instance will be avoided, as well as shocks or jars and temporary loss of power in shifting from one speed to another.

The invention has for a still further object a variable speed transmission mechanism in which the control is greatly simplified over the ordinary selective sliding transmission now commonly employed, owing to the fact that with my invention, the speeds may be changed from low to reverse or to intermediate and high, and so on, by the single movement of a simple actuating rod and lever, and without the necessity of using more than one lever, or of laterally moving said lever as is necessary with the ordinary sliding selective transmission mechanism heretofore used, the non-sliding principle which is embodied in the invention making the operation practically "fool proof" and rendering it impossible to endanger the transmission mechanism by any hasty or uncertain movement of the actuating lever.

A still further object of this invention is to so peculiarly arrange and construct a transmission mechanism that it may, together with the differential gearing and a brake mechanism, be inclosed in a single casing and be comprehended as a unit gearing or transmission mechanism, rigidity and compactness being thereby secured, wherein the sole mechanism may run in a bath of oil to increase the durability and efficiency of the device, and wherein the complete mechanism is relatively light in weight. And the invention has for a still further object to simplify and generally improve this class of devices and to render them more useful and commercially desirable.

For a full understanding of the invention, reference is to be had to the following description and accompanying drawings, in which:

Figure 1 is a transverse sectional view through a transmission mechanism embodying the improvements of my invention; Fig. 2 is a side elevation thereof, partly broken away; Fig. 3 is a plan view of a brake mechanism employed; Fig. 4 is a side view thereof; Fig. 5 is a detail perspective view of a portion of an actuating rod employed; and, Fig. 6 is a detail view of a portion of one of the expanding clutch bands.

Corresponding and like parts are referred to in the following description and indicated in all the views of the drawings by the same reference characters.

Referring to the drawings, the numeral 1 designates the transmission drive shaft leading from the engine, and 2 designates the master gear which is keyed or otherwise secured to the shaft 1 and which is provided in the present instance with three sets of teeth concentrically arranged, as shown, the innermost set constituting the low drive gear, designated 3, the next set 4 constituting the intermediate drive and the outermost set constituting the high gear, designated 5. These low, intermediate and high gears 3, 4 and 5, lie substantially in the same plane, but with different face angles, as is manifest, and they are at all times respectively in mesh with correspondingly faced teeth that are formed on the low, intermediate and high driven gears, designated $3^a$, $4^a$ and $5^a$, respectively. The low driving gear 3 is also at all times in mesh with a reverse driven gear R which is located on the opposite side of the shaft 1 from the gears $3^a$, $4^a$ and $5^a$. All of the driven gears are substantially of the same interior bore, as is shown, the same being bored out to receive expanding clutch bands 6. Each of these bands is in the present instance thickened at about a middle point, as indicated at 7, the thickened portion being formed with a socket to receive a tenon 8 on the end of a band holder 9. Each of the band holders 9 is formed with a hub portion 10 keyed or otherwise secured to the steel tubing 11 which is mounted on the jack shaft 12. The hubs 10 of the band holders 9 are also secured, as by screws 13, to plate or disk casings 14 arranged in pairs on opposite sides of the respective driven gears, as best illustrated in Fig. 2, and formed with inturned rim edges 15 constituting ball races which co-act with corresponding races 16 formed on opposite sides of the rims of said driven gears, anti-friction balls 17 being interposed between the two races, whereby to take the wear entirely off of the expanding clutch bands 6, when the latter are not engaged with their corresponding driven gears. In order to expand the bands 6, one end of each band has a pair of links 18 pivotally connected to it on opposite sides, as illustrated in Fig. 6, each pair of links being pivotally connected at their inner ends to a lever 19, intermediate of the ends of the latter. Each lever is fulcrumed at one end in the recessed opposite end of its band, as indicated at 20, and the lever extends inwardly and somewhat tangentially, as shown, the free end of the lever being preferably laterally extended and rounded, as indicated at 21, so as to provide a proper bearing surface, and carrying a set screw 22 intended to screw down against the spring steel 22$^a$ on the lower side of said lever to press the spring down and take up wear. The bearing ends 21 of the levers 19 are adapted to be engaged by an actuating rod or shaft 23 which is designed to be entered by an endwise movement through registering openings 24 formed in the disk casings, said actuating rod being formed with a preferably double bevel cam 25 designed for engagement with the bearing ends of the respective levers, one at a time, as selected, in order to expand any desired clutch band 6 and thereby effect the operative connection between the corresponding driven gear and the sleeve or tubing 11 of the driven shaft.

From so much of the description as has proceeded, in connection with the accompanying drawings, it is evident that by an endwise movement of the rod 23, the cam 25 of said rod may, by a simple movement of a single lever, foot pedal or other device, be brought opposite to and bear upon the laterally widened and rounded bearing end 21 of any of the levers 19 so as to swing such lever outwardly and expand the clutch band 6 to which it is connected to cause such band to frictionally and easily and yet practically rigidly engage with the encircling driven gear so as to operatively connect such gear with the driven shaft, while at the same time all of the other driven gears are still in mesh, but are obviously running free. Hence, it will be seen that there is no sliding of the gears, and consequently all stripping of the teeth is positively precluded. The cam 25 is placed in the space between the reverse gear R and low gear 3$^a$ when it is desired to bring the parts to neutral position.

I have shown no housing for my improved transmission mechanism, as it is to be understood that the invention does not reside in any particular form of housing, but that any oil bath housing may be employed, according to the judgment of the designer, or the particular requirements of the case. But it is to be also understood that in the same housing with the transmission gearing, the differential gearing is disposed. This differential gearing may comprise a casing 26 keyed or otherwise secured to the sleeve 11 and containing the differential gear wheels 27 between which are interposed any desired number of bevel pinions 28 held on stub shafts 29 carried by the casing 26 and meshing with the bevel teeth of the gears 27.

30 designates brake bands which are two in number in the present instance arranged on opposite sides of the intermediate flanges of the casing 26, said bands being adapted for contraction to exert their braking effect on the differential casing 26. In the present embodiment of the invention, one end of each of these brake bands 30 is connected to a link 31 and the other end is connected to a corresponding link 32, the links 31 and 32 being pivotally connected at one end to the oppositely extending arms 33 that are formed on or secured to a brake shaft 34. This brake shaft is provided with an operating crank 35 adapted to be operated by a foot treadle or otherwise. Preferably, the crank 35 may be located outside of the housing for the differential and other parts of the operating mechanism, and this housing may be either attached to the engine castings or securely fastened in any way to the bed or running gear of the vehicle. It will, of course, be seen that both of the brake bands 30 are contracted simultaneously, thereby producing an effective braking action.

It is to be understood that the embodiment of the invention illustrated in the accompanying drawing is of the double chain drive type, but that the shaft drive type is the same, except that the driven gears run on a single shaft and the differential is located in the rear axle.

Having thus described the invention, what is claimed as new is:

1. A transmission mechanism including a driven shaft, a set of gears mounted normally loose on said shaft, disks interposed between said gears and formed with registering openings eccentric to the driven shaft, clutches mounted in the gears and arranged to connect the same with the driven shaft, independent clutch operating means for the respective clutches, and a rod movable longitudinally through said openings into engagement with the clutch operating means of one gear at a time.

2. A transmission mechanism including a driven shaft, a set of gears normally loose on said shaft, clutches mounted in said gears and arranged to connect the same with the driven shaft, disks interposed between said gears and formed with registering openings, a rod movable through said openings and formed with a cam, and clutch operating arms for the respective clutches projecting into the path of movement of said cam, for the purpose specified.

3. A transmission mechanism including a drive shaft, a master gear mounted thereon and formed with a plurality of sets of teeth, gears meshing with the different sets of teeth on one side of said shaft, another gear meshing with one set of teeth on the opposite side of said shaft and spaced from the first named gears, disks interposed between said gears and formed with registering openings, clutches mounted in said gears, a driven shaft on which said gears are loosely mounted, said gears being arranged for connection to the driven shaft by said clutches, and a rod movable longitudinally through said openings and formed with a cam arranged normally in the space between the first named gears and the other gear, said cam being designed upon the movement of the rod in one direction or the other to expand the clutches of one of the first named gears or the other gear for the purpose specified.

In testimony whereof, I affix my signature in presence of two witneses.

HORACE L. McCURDY. [L. S.]

Witnesses:
JOHN N. MEELLOCK,
JAMES E. McCORD.

---

Copies of this patent may be obtained for five cents each, by addressing the "Commissioner of Patents, Washington, D. C."